Nov. 3, 1964  M. J. STAM  3,155,854
ELECTROMAGNETIC VIBRATOR MOTOR
Filed April 29, 1963
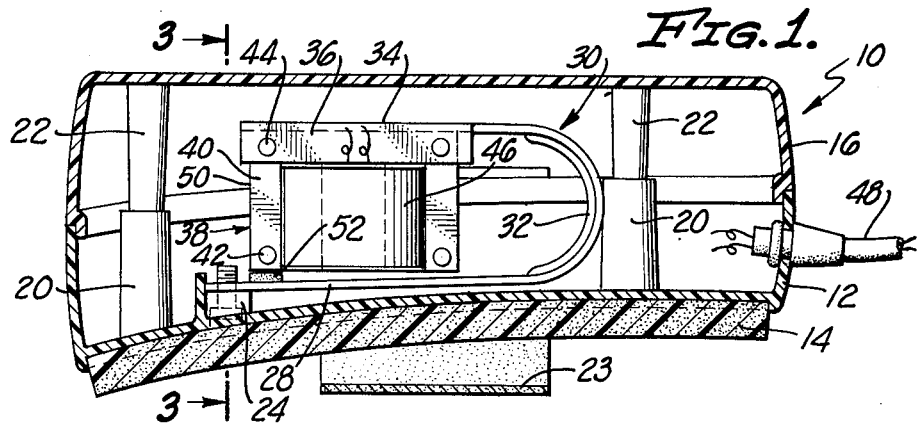
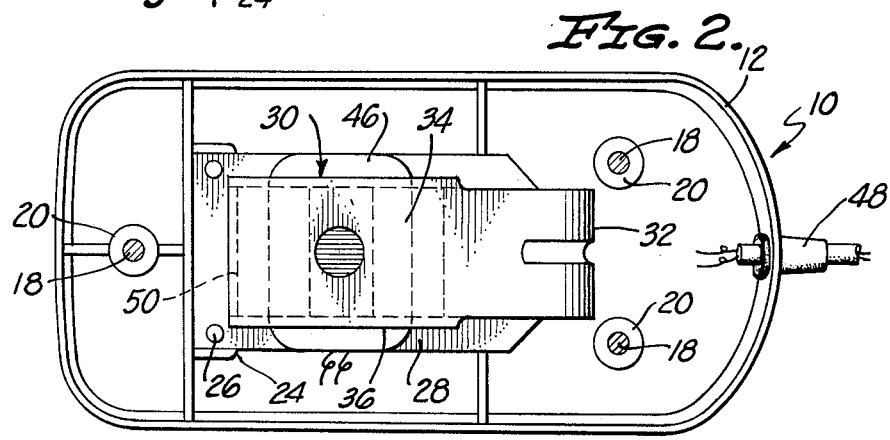
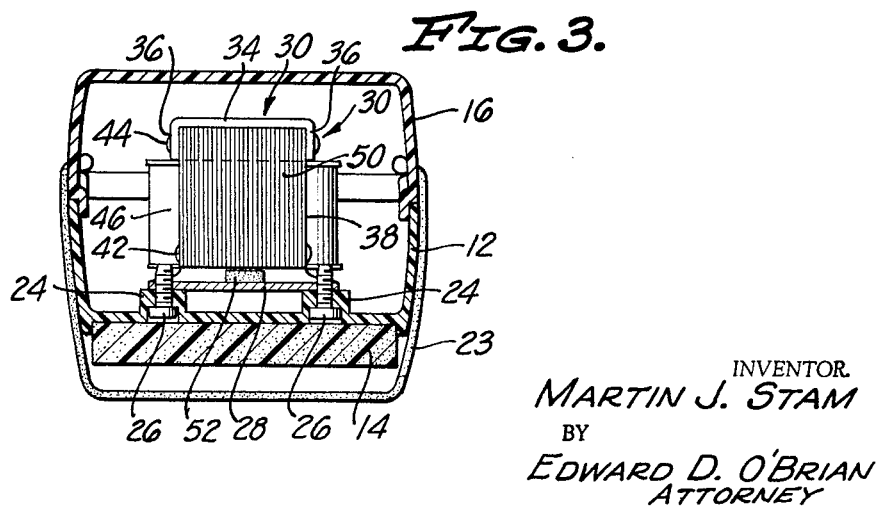
INVENTOR.
MARTIN J. STAM
BY
EDWARD D. O'BRIAN
ATTORNEY

United States Patent Office 3,155,854
Patented Nov. 3, 1964

3,155,854
ELECTROMAGNETIC VIBRATOR MOTOR
Martin J. Stam, Westminster, Calif., assignor, by mesne assignments, to The Songrand Corp., Kansas City, Mo., a corporation of Missouri
Filed Apr. 29, 1963, Ser. No. 276,258
4 Claims. (Cl. 310—29)

This invention relates to a vibrator motor mounting.

In summary, this invention is directed to novel mounting means for electromagnetic vibrator motors which permits such motors to be more effective. The mounting comprises an armature mounted as a resilient cantilever member and which is formed as part of a U-shaped spring member to which the electromagnet is secured. The armature portion of the spring member is secured to a motor securing boss on the element that is to be vibrated by the motor. Such mounting for a vibrator motor permits both the spring member and electromagnet to act as active vibrating elements thereby providing more vibration energy than is possible in the same size motor mounted on a conventional base.

Accordingly, it is an object of this invention to provide motor mounting means which permits a vibrator motor to produce more vibrating energy than has heretofore been possible.

It is another object of this invention to mount a vibrator motor on a cantilever armature so that both the motor electromagnet and the motor armature are free to vibrate and transmit more vibrating energy to the member upon which the motor is mounted.

It is another object of this invention to provide motor mounting means which increases the vibrating efficiency of the vibrator motor, so that the same size motor can produce greater vibrating energy, or a smaller motor can produce the same vibrating energy as a conventionally mounted vibrator motor.

It is another object of this invention to mount a vibrator motor by the mounting of the instant invention upon a base, the vibration of which is beneficial.

Other objects of this invention will become apparent upon study of the following specification, claims and attached drawing in which:

FIGURE 1 is a partial longitudinal vertical section of a vibrator motor, mounted in accordance with this invention, within a housing which is vibrated by the motor;

FIGURE 2 is a top plan view of the motor mounted within the housing with the top cover thereof removed; and FIGURE 3 is a vertical section taken along the line 3—3 of FIGURE 1.

Referring now to the drawings, a housing-motor combination, employing the motor mount of this invention is shown generally at 10. The housing includes a lower case 12 which carries on its lower side a resilient pad 14 made of polyurethane foam, rubber foam or the like. The housing includes an upper case 16 which is secured to and interengages with the lower case 12 to form the complete housing. The upper and lower cases are held together by screws 18 passing through clearance holes in bosses 20 and engaging in screw threads in bosses 22. The particular housing herein described is the housing of a vibrator intended to be held upon the back of a hand to aid in massaging techniques. Accordingly, the housing carries a strap 23 which passes around the palm of the hand when in use.

The lower case 12 carries one or more bosses 24 which are perforated for motor mounting screws 26. Secured to the top of the bosses 24 by screws 26 is the U-shaped spring member 28 of the vibrator motor generally shown at 30. The spring member 28 extends off of the bosses 24 freely cantilevered to form a first leg and is bent at 32 to form a second leg 34 extending back in a direction generally parallel to the first leg of the spring member. The leg 34 has bent down flange edges 36 between which is mounted electromagnet 38.

The electromagnet 38 is comprised of E-shaped laminations 40 stacked together and held by rivets 42, passing through the stack, and by rivets 44 passing through the stack and through the bent down flange edges 36 of leg 34 of the stator 28. The E-shaped laminations 40 carry an electromagnetic coil 46 on the inner leg thereof, and in operation the coil 46 is energized by power from line 48. The case or line may be provided with a switch if desired to turn the motor 30 on and off independently of plugging the line 48 into an electric socket. Of course, the coil 46 is designed to be compatible with the available electricity supplied by line 48.

The front end of the motor 30 is defined by the end 50 of the laminations 40. Underneath the front end of the motor a small piece of resilient damping material 52 is mounted in the small space between the face of the E-shaped laminations and the stator 28.

The significant aspects of this invention is represented by the fact that the front end 50 of the laminations, and thus the entire energizing section of the vibrator motor 30 is mounted beyond the mounting screws 26, and is entirely cantilevered. The center line of the mounting screws 26 represents the firm mounting of the stator 28, and the interval between the center line of the screws and the edge of the boss in the direction of cantilever represents the area where the stator 28 can freely move in one direction and is damped in the other. In the direction of cantilever beyond the end of bosses 24, the entire spring member 28 can vibrate freely due to its cantilever mounting. By this particular configuration of mounting, the vibrator motor 30 transmits more vibrating energy to the lower case 12 than is possible by a rigid mount upon the case 12 of a motor of the same size.

Upon energization by alternating current, the coil 46 creates an alternating magnetic field which is directed by the E-shaped laminations 40. This field acts upon the cantilever mounted portion of the stator 28 and the entire motor vibrates by flexure, not only in the area of bend 32, but by bending throughout the entire spring member 28 including the cantilevered first leg. In view of the mass represented by the laminations 40 and coil 46, considerable vibration is transmitted to the bosses 24, which in turn transmit the vibration to the entire lower case 12, accordingly vibrating the entire motor housing combination 10.

Applicant having described his invention in its preferred embodiment, it is clear that it is susceptible to modifications by routine engineering. Accordingly, the scope of the invention is defined by the following claims.

I claim:

1. In a vibrator device, the combination of:
    a housing member to be vibrated, and
    a vibrator motor connected with said housing member, said vibrator motor including
    (a) a substantially U-shaped spring member having a first leg and a second leg joined by an intermediate bend,
    (b) said first leg secured at its outer end portion to said housing member and extending in cantilever fashion with respect to said member with the extending portion of the first leg spaced from and normally free from contact with the housing member wall so that said spring member is capable of vibration independently of said housing member,
    (c) said second leg extending in cantilever fashion from said bend and spaced in overlying relationship with said first leg, and (d) an electromagnet secured to the inside of said second leg and in cooperating relationship with said first leg to cause simultaneous vibration of said electromagnet and second leg relative to said first leg and said electromagnet and spring member relative to said housing member.

2. The combination as in claim 1 wherein said electromagnet comprises a core and cooperating electric coil to induce a directed magnetic flux, the major portion of the flux threading the extending portion of said first leg.

3. The combination as in claim 1 wherein said housing member includes an interior boss having a substantially flat outer face, the outer end portion of said first leg engaging said boss and in face to face contact therewith, and including connector means extending through said boss and end portion and tightly securing said end portion against said boss.

4. The combination as in claim 1 including resilient damper means operably positioned between said electromagnet and first leg of said U-shaped spring member.

No references cited.

MILTON O. HIRSHFIELD, *Primary Examiner.*